(12) United States Patent
Krause et al.

(10) Patent No.: US 7,722,347 B2
(45) Date of Patent: May 25, 2010

(54) APPARATUS AND DIE CARTRIDGE ASSEMBLY ADAPTED FOR USE THEREWITH, AND PROCESS FOR PRODUCING FIBROUS MATERIALS

(75) Inventors: Timothy Krause, Mooresville, NC (US); Michael H. Johnson, Mooresville, NC (US); Richard Ferencz, Isle of Palms, SC (US)

(73) Assignee: Polymer Group, Inc., Charlotte, NC (US)

( * ) Notice: Subject to any disclaimer, the term of this patent is extended or adjusted under 35 U.S.C. 154(b) by 181 days.

(21) Appl. No.: 11/720,822

(22) PCT Filed: Jun. 20, 2006

(86) PCT No.: PCT/US2006/023827
§ 371 (c)(1),
(2), (4) Date: Jun. 4, 2007

(87) PCT Pub. No.: WO2007/001990
PCT Pub. Date: Jan. 4, 2007

(65) Prior Publication Data
US 2009/0295020 A1 Dec. 3, 2009

Related U.S. Application Data

(60) Provisional application No. 60/692,116, filed on Jun. 20, 2005.

(51) Int. Cl.
*B28B 13/00* (2006.01)
*B29C 47/12* (2006.01)

(52) U.S. Cl. .................. 425/72.2; 425/7; 425/192 S; 425/83.1; 425/131.5; 425/378.2; 264/555; 264/210.8

(58) Field of Classification Search ............... 425/7, 425/72.1, 72.2, 192 S, 83.1, 66, 131.5, 378.2; 264/556, 555, 210.8
See application file for complete search history.

(56) References Cited

U.S. PATENT DOCUMENTS

| 4,536,361 | A | | 8/1985 | Torobin |
| 4,670,202 | A | * | 6/1987 | Uenoyama et al. ............ 264/39 |
| 5,183,670 | A | | 2/1993 | Trudeau |
| 5,580,581 | A | | 12/1996 | Buehning |

(Continued)

FOREIGN PATENT DOCUMENTS

WO    2007001990 A2    1/2007

*Primary Examiner*—Maria Veronica D Ewald
(74) *Attorney, Agent, or Firm*—Kilyk & Bowersox, PLLC; Valerie Calloway

(57) ABSTRACT

Apparatus (100, 101, 102) and die cartridge assembly (18, 44, 45, 47) adapted for use with same for producing fibrous material (212). The apparatus (100) comprises a removably attachable die cartridge assembly (18) that adapts to conventional spunmelt equipment. The die cartridge assembly (18) is removably positionable beneath an extrusion body (10) for effecting formation of fibrous material by fibrillation of polymer films. The cartridge assembly (18) includes at least one polymer passage (19) communicating with a molten polymer source (10) for directing molten polymer onto at least one film forming surface (20, 28) defined by the cartridge assembly (18), and also defines at least one gas passage (222, 22, 30) communicating with a gas source (16) for directing pressurized gas (220) against the molten polymer (210) in the form of a film for effecting formation of the fibrous material (212).

30 Claims, 10 Drawing Sheets

U.S. PATENT DOCUMENTS

| | | |
|---|---|---|
| 5,605,706 A | 2/1997 | Allen et al. |
| 5,632,938 A | 5/1997 | Buehning, Sr. |
| 6,315,806 B1 | 11/2001 | Torobin et al. |
| 6,382,526 B1 | 5/2002 | Reneker et al. |
| 6,422,848 B1 * | 7/2002 | Allen et al. ............... 425/7 |
| 6,705,851 B2 * | 3/2004 | Suzuki ................. 425/72.1 |
| 2002/0053390 A1 | 5/2002 | Allen |

* cited by examiner

APPARATUS AND DIE CARTRIDGE ASSEMBLY ADAPTED FOR USE THEREWITH, AND PROCESS FOR PRODUCING FIBROUS MATERIALS

CROSS-REFERENCE TO RELATED APPLICATIONS

The present application is a National Stage Application of PCT/US06/23287, filed Jun. 20, 2006, which was based on, and claimed benefit of, U.S. Provisional Application Ser. No. 60/692,116, filed on Jun. 20, 2005, both of which are hereby incorporated herein by reference in their entireties.

TECHNICAL FIELD

The present invention generally relates to producing fibrous material, and more specifically relates to a removably attachable die cartridge assembly adapted for use with a spunmelt apparatus, such as conventional spunmelt equipment, wherein the die cartridge assembly is removably positionable beneath an extrusion body to provide an apparatus for effecting formation of fibrous material by fibrillation of polymer films.

BACKGROUND ART

Continuous and discontinuous filament spinning technologies are known in art, and are commonly referred to as spunmelt technologies. Spunmelt technologies include both the meltblown or spunbond processes. A spunbond process involves supplying a molten polymer, which is then extruded under pressure through a large number of orifices in a plate known as a spinneret or die. The resulting continuous filaments are quenched and drawn by any of a number of methods, such as slot draw systems, attenuator guns, or Godet rolls. The continuous filaments are collected as a loose web upon a moving foraminous surface, such as a wire mesh conveyor belt. When more than one spinneret is used in line for the purpose of forming a multi-layered fabric, the subsequent webs are collected upon the uppermost surface of the previously formed web.

The melt-blown process is related to means of the spunbond process for forming a layer of a nonwoven fabric, wherein, a molten polymer is extruded under pressure through orifices in a spinneret or die. High velocity air impinges upon and attenuates the filaments as they exit the die. The energy of this step is such that the formed filaments are greatly reduced in diameter and are fractured so that microfibers of indeterminate length are produced. This differs from the spunbond process whereby the continuity of the filaments is preserved.

Spunmelt equipment manufacturing companies, such as Reifenhäuser, Ason Neumag, Nordson, and Accurate Products have engineered numerous meltblown and/or spunbond manufacturing models that offer a variety of desirable attributes, such as increased polymer throughputs, better management of process air flow or polymer distribution, and improved control of filament deviations, to name a few. U.S. Pat. Nos. 4,708,619; 4,813,864; 4,820,142; 4,838,774; 5,087,186; 6,427,745; and 6,565,344, all of which are incorporated herein by reference, disclose examples of manufacturing equipment for the processing of spunbond or meltblown materials.

In addition to the number of known equipment models that are commercially available, spunmelt manufacturing assets are also known to be of a sizeable scale, requiring extensive space, and can be a substantial investment. Such factors may be considered hindrances when evaluating the need for additional manufacturing capacity, upgraded assets, or new innovative technologies. A need remains for an apparatus, such as a cartridge assembly, that adapts to conventional spunmelt manufacturing equipment in order to upgrade a technology or introduce an entirely new technology to an otherwise standard manufacturing line.

DISCLOSURE OF THE INVENTION

The present invention is generally directed to an apparatus and die cartridge assembly adapted for use with same for producing fibrous material. The apparatus comprises a removably attachable die cartridge assembly that adapts to conventional spunmelt equipment. The die cartridge assembly is removably positionable beneath an extrusion body for effecting formation of fibrous material by fibrillation of polymer films. The cartridge assembly includes at least one polymer passage communicating with a molten polymer source for directing molten polymer onto at least one film forming surface defined by said cartridge assembly, and also defines at least one gas passage communicating with a gas source for directing pressurized gas against the molten polymer in the form of a film for effecting formation of the fibrous material. The film forming surface may be annular or alternatively non-annular in various embodiments of the present invention.

In one embodiment, the die cartridge assembly of the invention can be engineered to fit standard spunmelt manufacturing equipment offered by suppliers such as Reifenhauser, Ason-Nuemag, Lurgi Zimmer, Accurate Products, Nordson, and Impianti. Standard spunmelt equipment is comprised of a polymer extrusion body through which molten polymer is directed for delivery to an elongated polymer cavity at the lower portion of the extrusion body, as well as at least one gas manifold, and typically a pair of said gas manifolds, positioned adjacent to the extrusion body or on respective opposite sides of said extrusion body for supplying pressurized gas generally beneath the extrusion body generally along the length of the polymer cavity.

In accordance with an embodiment of the invention, a removably attachable die cartridge assembly is positioned beneath the extrusion body for effecting formation of fibrous material by fibrillation of polymer films, wherein the cartridge assembly comprises at least one polymer passage communicating with a polymer cavity defined within the standard spunmelt manufacturing equipment, or from an independent source. The polymer is directed from the polymer cavity through at least one polymer passage and onto at least one film forming surface defined within the cartridge assembly. The cartridge assembly further comprises at least one gas passage communicating with the gas manifold of the spunmelt equipment for directing pressurized gas from the gas manifold against the molten polymer in the form of a film for effecting formation of fibrous material.

In one embodiment, the film forming surface defined by the cartridge assembly is annular, wherein at least one gas passage defined by the cartridge assembly directs pressurized gas from the gas manifold to the center of the annular film forming surface against the molten polymer. Preferably, a plurality of annular film forming surfaces are defined within the cartridge assembly, and a plurality of gas passages for directing pressurized gas against molten polymer in the form of a film, effecting formation of fibrillated fibrous material from each of the film forming surfaces.

The cartridge assembly in another embodiment is further described to include a lower die element, which defines a plurality of film forming surfaces, an intermediate die element positioned adjacent to the lower die element, and an upper die element positioned above and adjacent to the intermediate die element. In addition, the cartridge assembly comprises a plurality of nozzle inserts positioned between the intermediate and lower elements that fit generally within the bottom die element in respective operative association with the film forming surfaces.

In other embodiments, the film forming surface defined by the cartridge assembly is linear, wherein the die cartridge assembly defines at least one, and preferably a pair of linear film forming surfaces arranged in converging relationship to each other, and in parallel relationship to the polymer cavity. Further, the die cartridge assembly defines an elongated gas passage extending parallel to the polymer cavity for directing pressurized gas against molten polymer in the form of a film directed from both pair of linear film forming surfaces. Film fibrillation is believed to occur once the path(s) of the film and gas intersect which may begin to occur as the film descends against the film forming surfaces and may continue to occur as the film is deposited into the gaseous stream. In yet another embodiment, the die cartridge assembly may define a pair of gas passages arranged in converging relationship for each directing pressurized gas against a respective one of a pair of parallel film forming surfaces.

In embodiments of the present invention, the film-forming surface defined by the die cartridge assembly may form an angle with walls defining the gas passage that feeds the pressurized gas into the film-forming area of the die cartridge assembly which is not necessarily limited, and may vary from approximately 0 to approximately 180 degrees, i.e., the film-forming surface and gas passage walls may generally extend relative to each other at an acute, right, or obtuse angle.

Processes for using the die cartridge assembly in apparatus used for forming fibrous material products are also provided in additional embodiments of the invention.

Other features and advantages of the present invention will become readily apparent from the following detailed description, the accompanying drawings, and the appended claims.

Figure 1:
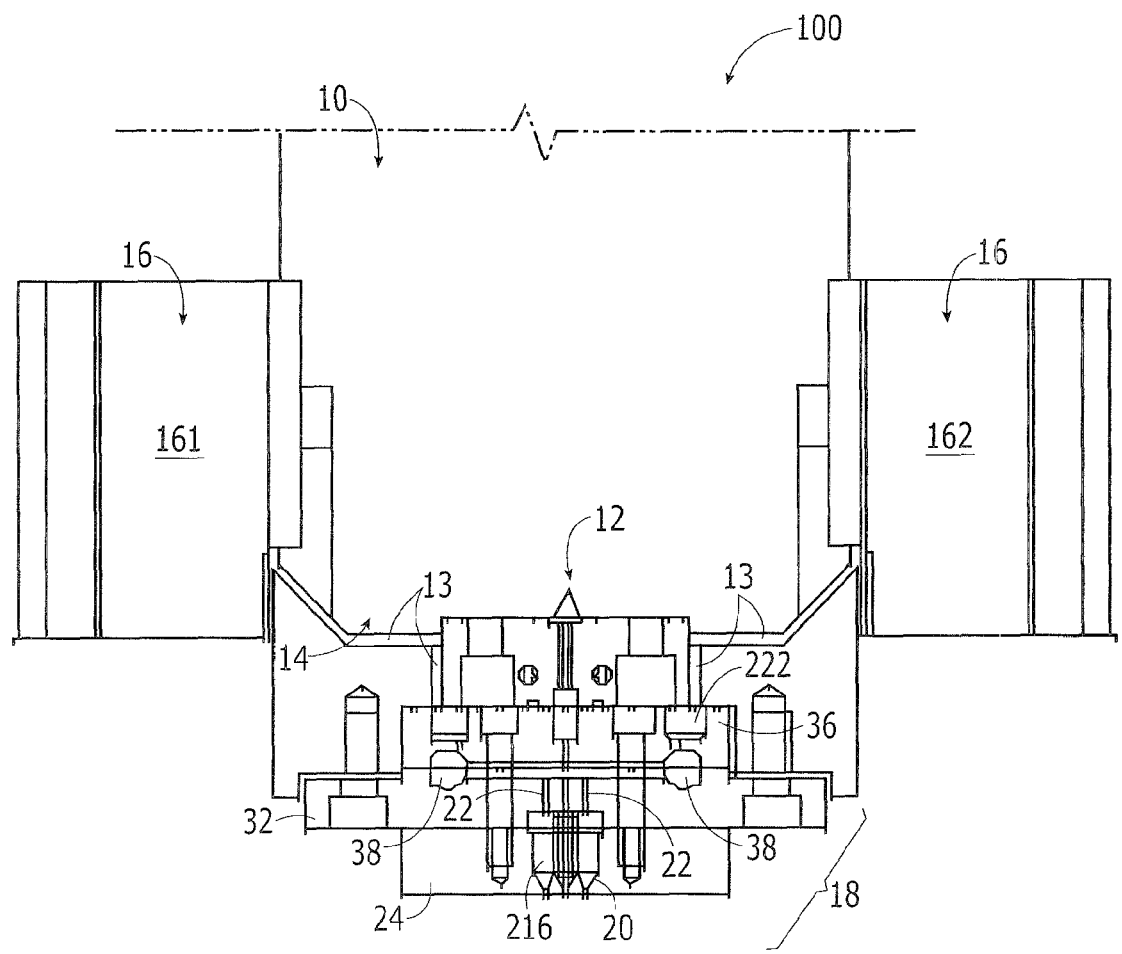
FIG. 1 is a sectional view of an illustrative embodiment of the apparatus of the present invention, including a die cartridge assembly defining a film forming surface that is an annular surface.

The features depicted in the figures are not necessarily drawn to scale. Similarly numbered elements in different figures represent similar components unless indicated otherwise.

DETAILED DESCRIPTION

While the present invention is susceptible of embodiment in various forms, there is shown in the drawings and will hereinafter be described a presently preferred embodiment of the invention, with the understanding that the present disclosure is to be considered as an exemplification of the invention, and is not intended to limit the invention to the specific embodiment illustrated.

Figure 4:
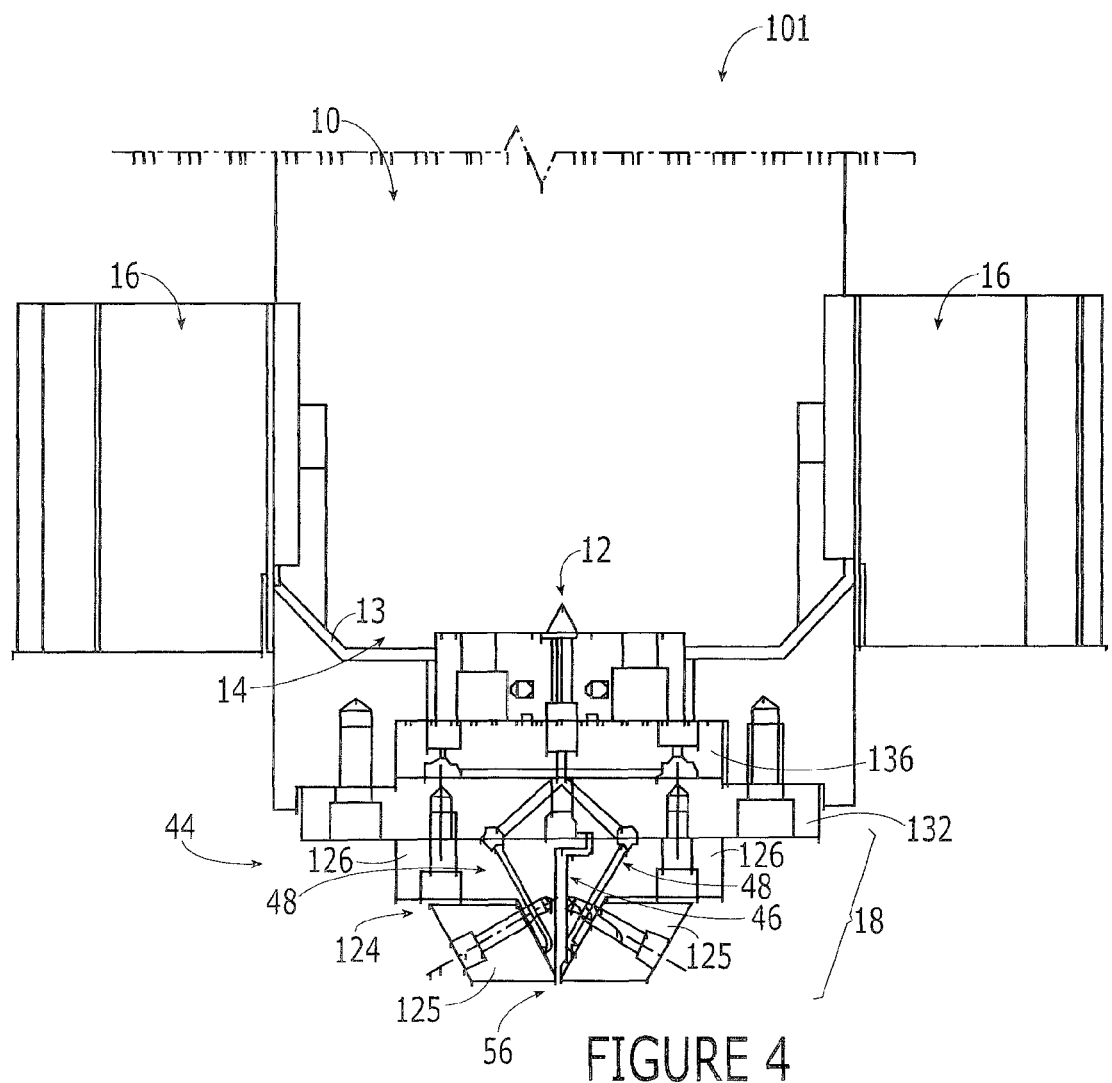
FIG. 4 is a sectional view of an illustrative of another embodiment of the apparatus of the present invention, wherein the film forming surface defined by the die cartridge assembly is a linear surface and referred to a double slot die.
Figure 6:
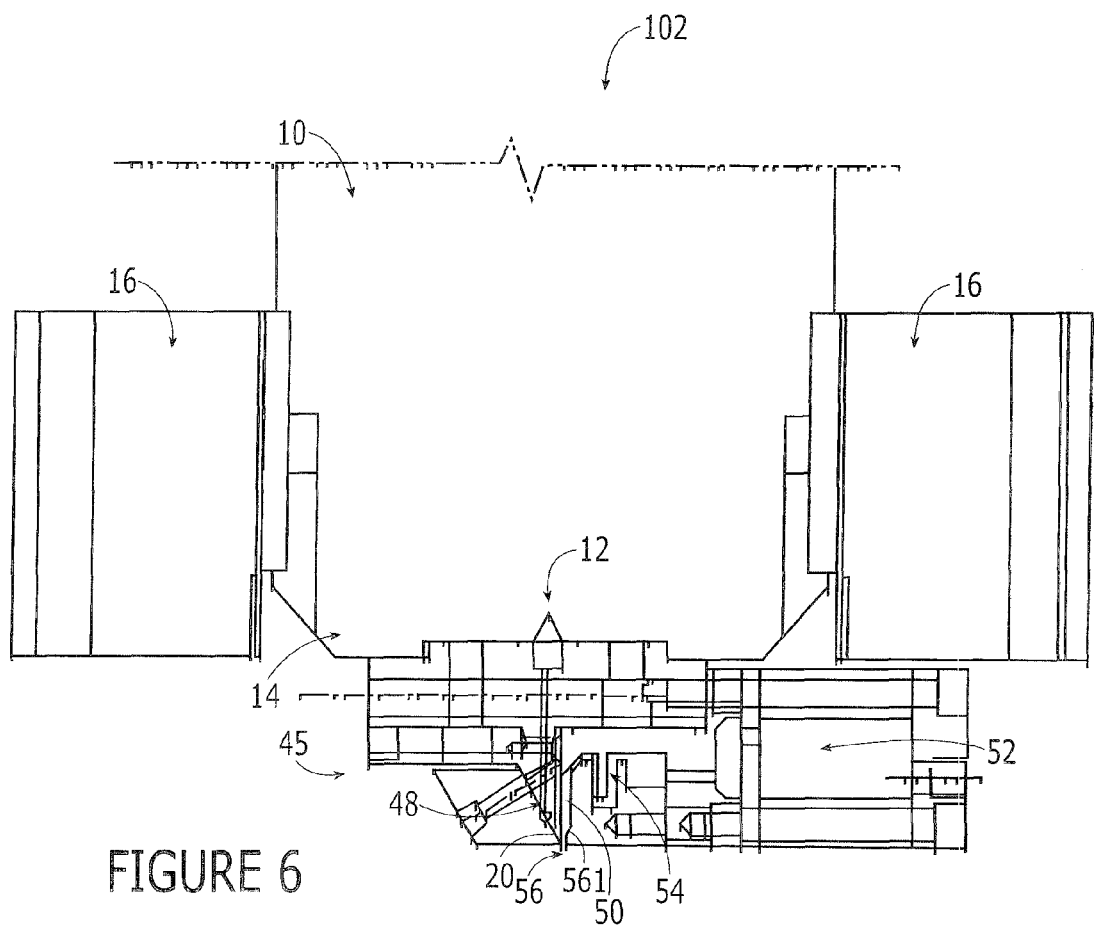
FIG. 6 is a sectional view an illustrative of yet another embodiment of the apparatus of the present invention, wherein the film forming surface defined by the die cartridge assembly is also a linear surface and referred to a single slot die.

An apparatus (100, 101, 102) for producing fibrous material in accordance with the present invention is illustrated in embodiments of the accompanying Figures and generally comprises a polymer extrusion body 10 through which molten polymer is directed for delivery to an elongated polymer cavity 12 at the lower portion 14 of extrusion body 10 (see, e.g., FIGS. 1, 4 and 6). At least one gas manifold 16 is positioned adjacent to extrusion body 10 for supplying pressurized gas generally beneath extrusion body 10 generally along the length of polymer cavity 12. Preferably, a pair of gas manifolds 16 is positioned on respective opposite sides of extrusion body 10 for supplying pressurized gas to cartridge assembly 18. The aforementioned polymer cavity and gas manifolds are standard elements of conventional spunmelt manufacturing equipment commercially offered by manufacturing companies such as Reifenhauser, Ason Neumag, Lurgi Zimmer, and Impianti.

Figure 3:
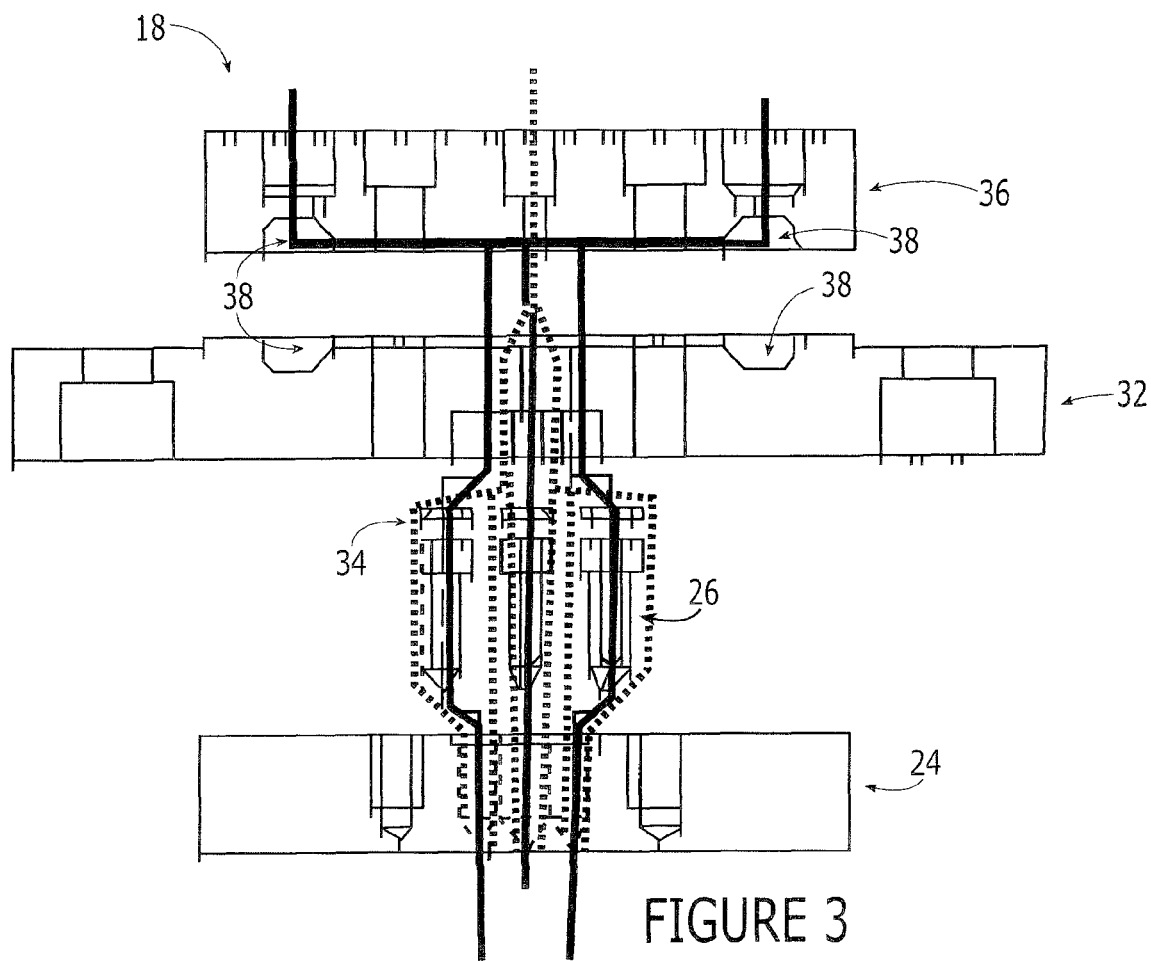
FIG. 3 is a view of the die cartridge assembly of FIG. 2 which schematically shows polymer flow routes (dashed lines) and gas flow routes (solid lines) through the component.

In accordance with the present invention, a removably attachable die cartridge 18 assembly is positionable beneath extrusion body 10 for effecting the formation of fibrous material by fibrillation of polymer films (see, e.g., FIGS. 1, 4 and 6). Cartridge assembly 18 defines at least one polymer passage communicating with polymer cavity 12 for directing a molten polymer onto at least one film forming surface 20 defined by cartridge assembly 18. Cartridge assembly 18 further defines at least one gas passage 222/22/30 communicating with gas manifold 16, and more preferably a plurality of gas passages 222/22/30, for directing pressurized gas from gas manifold 16 for impingement against molten polymer on the film forming surface 20 for effecting formation of fibrillated fibrous material (FIGS. 1, 3, 13).

Figure 2:
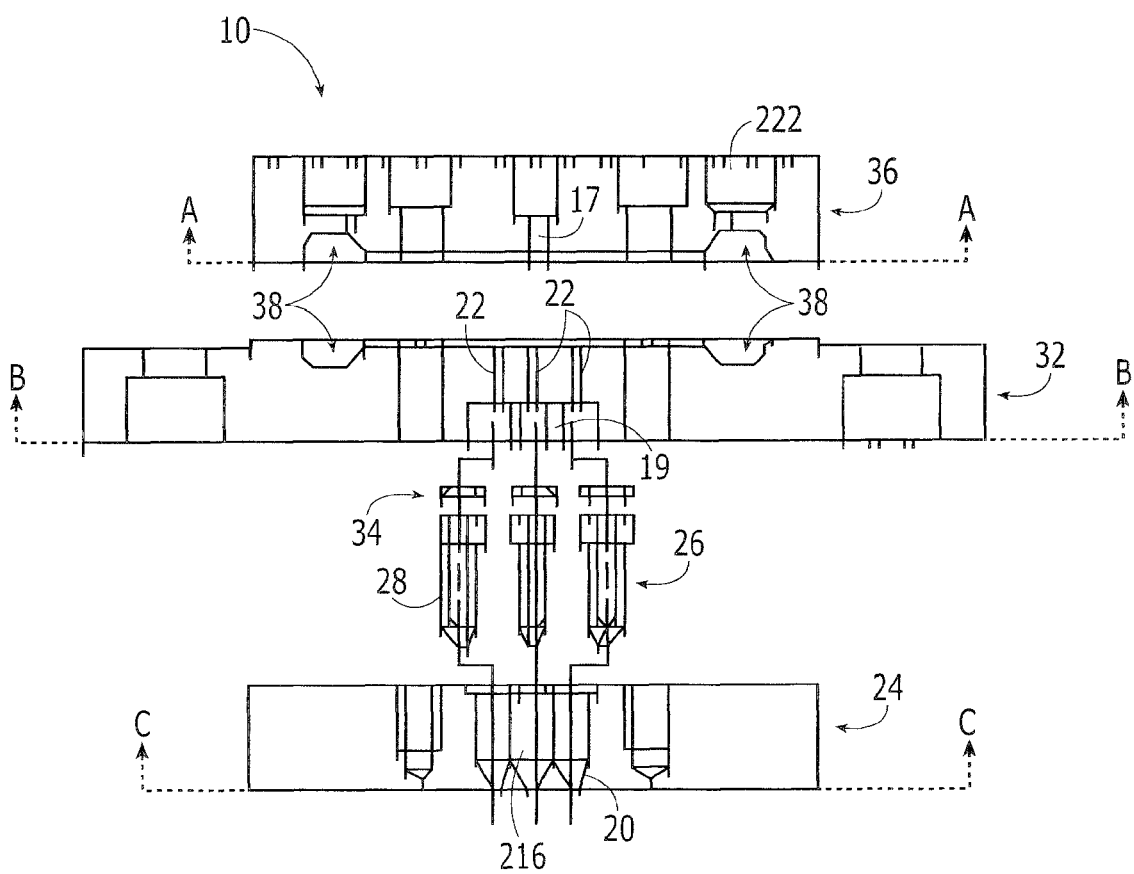
FIG. 2 is an expanded view of the die cartridge assembly component of the apparatus of FIG. 1.

In an illustrative embodiment shown as FIGS. 1 and 2, an apparatus 100 for producing fibrous material is illustrated in which a film forming surface 20 defined by cartridge assembly 18 is annular, and shown as circular in an illustrated embodiment. In the illustrated embodiment, a plurality of gas passages 222/22/30 defined by cartridge assembly 18 directs pressurized gas from gas manifold 16 centrally to and concentrically of the annular film forming surface(s) 20 for impingement against the molten polymer in the form of a film. It is also in the purview of the present invention to direct pressurized gas from gas manifold 16 centrally to and eccentrically of the annular film forming surface(s) 20. In this embodiment cartridge assembly 18 further includes a lower die element 24 which defines plural film forming surfaces 20, and respective plural nozzle inserts 26 that fit generally within lower die element 24 in respective operative association with the film forming surfaces 20. Cartridge assembly 18 defines at least one polymer passage 17/19/28 communicating with polymer cavity 12 for directing a molten polymer onto the film forming surface 20 defined by cartridge assembly 18 (e.g., see FIGS. 1-3 and 13). Cartridge assembly 18 defines a plurality of gas passages 222/22/30 communicating with gas manifold 16 for directing pressurized gas from gas manifold 16 for impingement against molten polymer on the film forming surface 20 for effecting formation of fibrillated fibrous material (e.g., see FIGS. 2-3).

Figure 13:
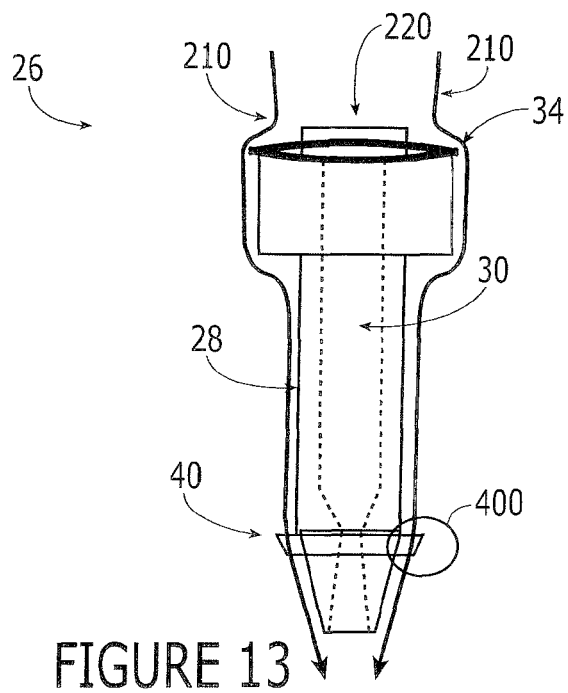
FIG. 13 is an illustrative embodiment of a nozzle insert of FIG. 1 of the present invention.

As illustrated (see FIGS. 2 and 13), each nozzle insert 26 defines an inner gas passage 30 receiving pressurized gas from a respective gas passage 22 for directing the pressurized gas therethrough and discharge thereof (FIG. 13). The molten polymer flows about the outer most surface of the nozzle insert 26 and further occupies the gap formed between the nozzle insert 26 and the lower die element 24 which receives the nozzle insert 26. Upon exiting inner gas passage 30, the pressurized gas impinges against the molten polymer on the respective film forming surfaces 20.

Cartridge assembly 18 in this illustrated embodiment includes an intermediate die element 32 positioned adjacent to lower die element 24, wherein plural nozzle inserts 26 are positioned between intermediate die element 32 and lower die element 24. Preferably, a deformable sealing element 34 (see FIG. 13), such as comprising a suitable Teflon® o-ring (Teflon is a registered trademark of DuPont), is operatively positioned between each nozzle insert 26 and intermediate die element 32 to maintain a predetermined spacing between the nozzle insert 26 and lower die element 24. Further still, cartridge assembly 18 includes an upper die element 36 positioned above and adjacent to intermediate die element 32. The upper die element 36 receives pressurized air from the manifold 16 via intermediate passages 13. Upper die element 36 and intermediate die element 32 together define at least one gas plenum chamber 38 that communicates with at least one gas manifold 16 and further communicates with each inner gas passage 30 defined by each nozzle insert 26 via gas passages 22 (see FIGS. 2 and 13). In one particular embodiment, upper die element 36 and said intermediate die element 32 define a pair of gas plenum chambers 38, which respectively communicate with a pair of gas manifolds 161 and 162 positioned on respective opposite sides of polymer extrusion body 10. As indicated, the pair of gas plenum chambers 38 further communicate with each inner gas passage 30 defined by each nozzle insert 26.

Figure 15:
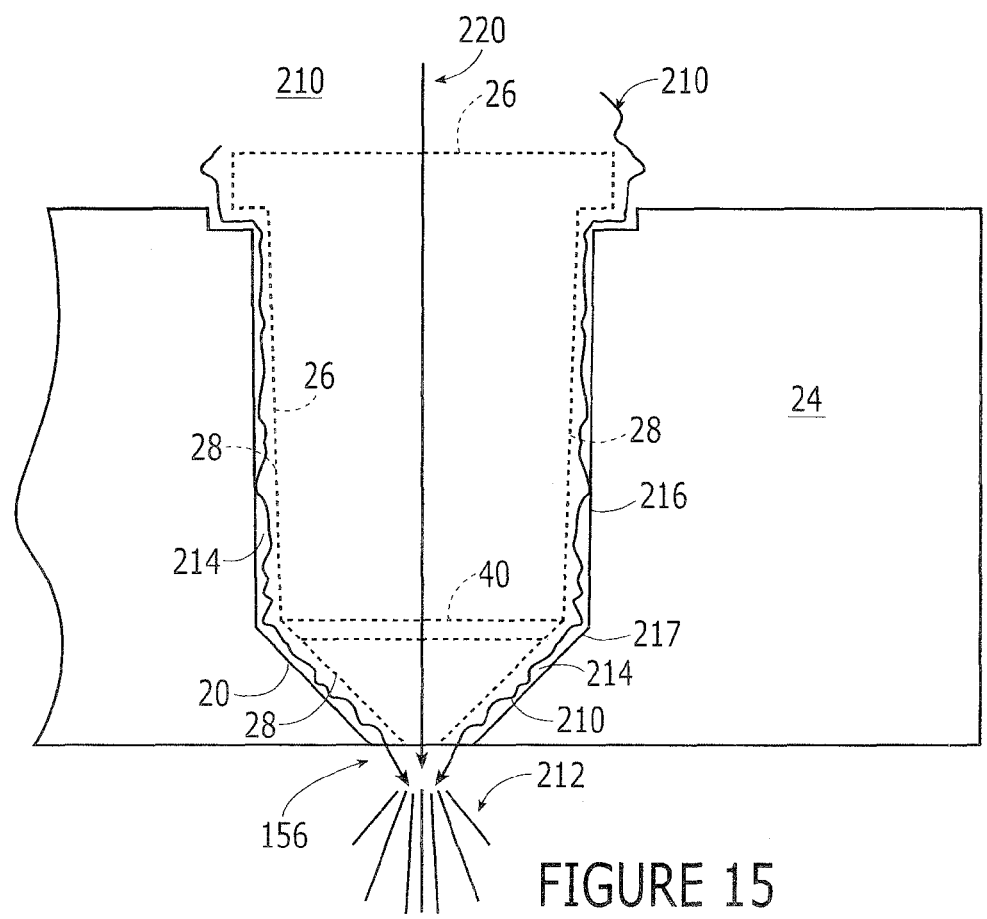
FIG. 15 is an enlarged isolated view of the nozzle insert of FIG. 14 as inserted in a corresponding cavity provided in the lower die element of the apparatus of FIG. 1.

Each nozzle insert has an exterior geometry sized to be received in close conformity to a correspondingly shaped cavity 216 provided in lower die element 24. Although this illustration shows three adjacent nozzle inserts received in three corresponding cavities provided in lower die element 24, it will be appreciated that one or any plurality of pairings of nozzle inserts and die element cavities might be used in this regard, within practical limitations. When the nozzle inert 26 is nested within a cavity 216 of die element 24, a thin gap 214 is provided and maintained between inner film forming wall 20 of the cavity 216 and the outer exterior wall 28 of the nozzle insert 26 (see FIGS. 1 and 15). Pressurized gas 220 is directed through gas passage 30 until is discharges from the lower discharge opening area 156 defined by the nozzle insert 26 and an opening in the lower die element 24, The gap 214 fills with polymer 210 and conducts it under pressure to a lower discharge opening area 156 where the polymer 210 is impinged upon by pressurized gas 220 effective to fibrillate the polymer 210 into a fibrous product material 212 (FIG. 15).

In one non-limiting embodiment, the cartridge assembly 18 may be readily attached/detached (i.e., mounted/demounted) from the extrusion body 10 via bolted connections and seals (not illustrated) provided on the upper die element 36 and lower portion 14 of the extrusion body 10. For example, manually accessible, laterally extending surfaces can be provided on the upper die element 36 and lower portion 14 of extrusion body 10, which co-extend and have alignable threaded through holes through which the two components may be bolted together. A fluid-tight seal may be provided between the bolted components via a deformable sealing element (not shown), such as comprising a suitable Teflon® o-ring, that is operatively positioned between the upper die element 36 and the lower portion 14 of the extrusion body 10. This attachment/detachment of the cartridge assembly to the extrusion body can be effected manually with handheld equipment. Among other advantages, this quick-mount feature of the cartridge assembly facilitates maintenance on and ease of cleaning of the respective components, and also substitution of a different cartridge assembly on the extrusion body which can be similarly mounted/demounted, if desired.

Figure 14:
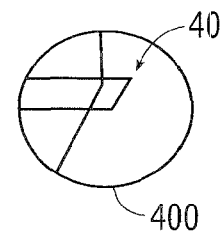
FIG. 14 is an isolated enlarged view of the encircled projection feature of the nozzle insert in FIG. 13.

Optionally, the nozzle inserts 26 may be separate elements from each other and easily replaced. In addition, in order to adjust the length of the film impingement surfaces the nozzle inserts 26 may be longer or shorter in length. Alternatively, two or more nozzle inserts 26 may be affixed to one another, or integrated with a portion of the assembly, such as upper die element 36. The nozzle inserts 26 may further include at least one stand-off projection 40, e.g., a shim, for engagement with lower die element to enhance the uniformity of the thickness of polymer film directed from the respective annular passage onto the respective film forming surface (see FIGS. 13-14). A standoff projection 40 is defined herein, and shown in FIGS. 13-14, as a one or more projections preferably formed integrally with each nozzle insert 26 for respective engagement with lower die element 24. The projection 40 is identified by circle 400 in FIG. 13, which is shown in an isolated enlarged view in FIG. 14. As indicated in FIGS. 13 and 15, the indicated flow path of polymer 210 proceeds inside standoff projection 40, which is an annular piece that is segmented or slit to allow the polymer to flow through it, and outside the exterior wall 28 of nozzle insert 26. Standoff projection 40 creates the above-mentioned thin gap 214 between inner film forming wall 20 of the cavity 216 and the outer exterior wall 28 of the nozzle insert 26. As indicated in FIG. 15, projection 40 conformably sits on upper regions of the inclined portions 217 of cavity 216. The polymer 210 preferably flows downward through gap 214 around the entire circumference of nozzle insert 26 until discharged at opening area 156. To simplify the illustration of FIG. 15, the profile of nozzle insert 26 and projection 40 thereof are shown in dashed lines.

Figure 10:
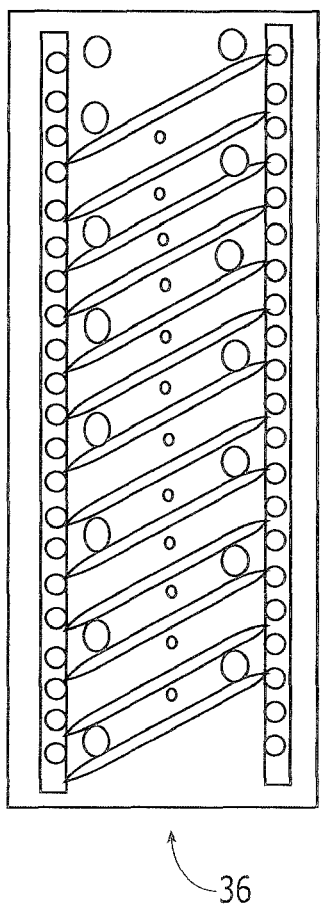
FIGS. 10, 11 and 12 are plan views of an illustrative embodiment shown at several levels of the die cartridge assembly of FIG. 2 along lines A-A, B-B and C-C thereof.
Figure 11:
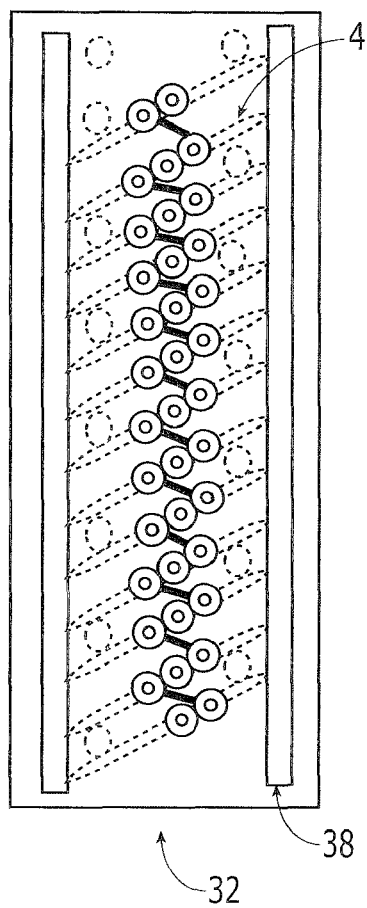
Figure 12:
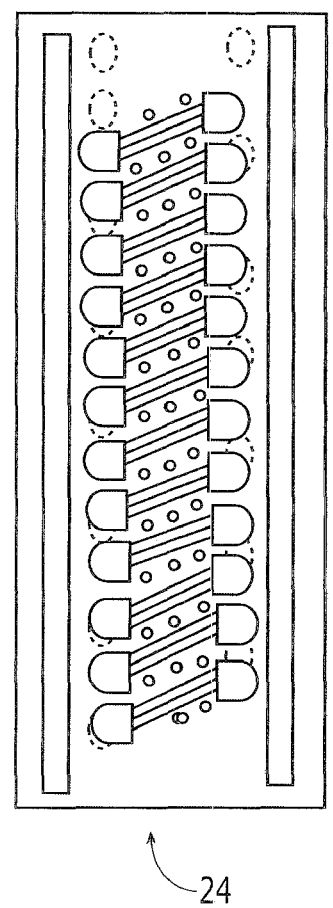

FIGS. 10-12 show a preferred arrangement of the nozzle inserts 26 within the cartridge assembly 18. Nozzle inserts 26 are preferably arranged in a plurality of linear arrays 42 in the die cartridge assembly 18, each linear array 42 of nozzle inserts are positioned along a respective line at an acute angle with respect to the polymer cavity 12. In addition, upper die element 36 and intermediate die element 32 define a plurality of gas distribution passages 22, each communicating with at least one air plenum chamber 38, with each gas distribution passage 22 positioned adjacent to the polymer cavity 12, and communicating with the inner gas passages 30 of the insert nozzles 26 of a respective array of insert nozzles 42, further illustrated in FIGS. 3, 11 and 13, wherein each array of nozzle inserts is arranged at the same acute angle. A fixed cartridge assembly is also in the purview of the present invention. In this embodiment, the nozzle inserts are permanently fixed to a single die element, wherein the nozzle inserts are an integral part of the cartridge assembly. The fixed cartridge assembly operates in accordance with the principles of the invention; however, the cartridge assembly lacks various elements that facilitate for adjustability in the assembly.

It is also within the purview of the present invention that the film forming surface defined by the cartridge assembly is non-annular, wherein non-limiting examples of non-annular film forming surfaces may include linear, wave-like, grooved, and the like.

Figure 5:
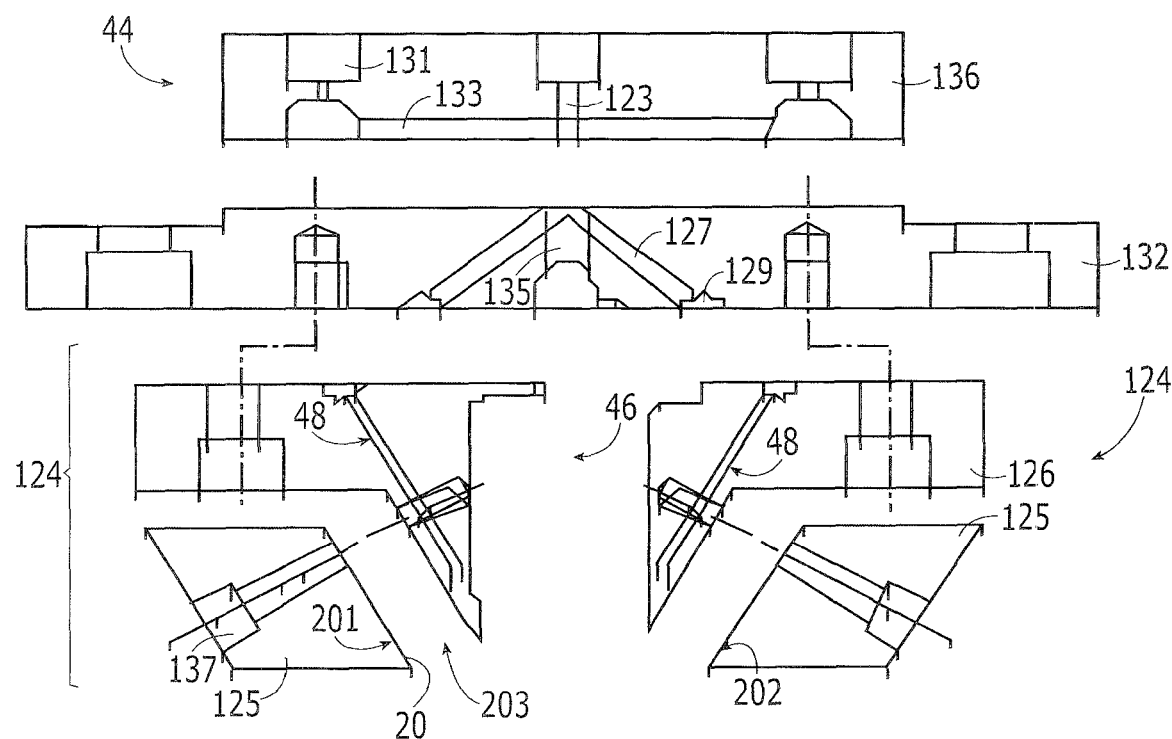
FIG. 5 is an expanded view of the die cartridge assembly of FIG. 4.

FIGS. 4 and 5 show an apparatus 101 for producing fibrous material in accordance with another illustrative embodiment wherein the film forming surface 20 defined by the cartridge assembly is linear. Further, the die cartridge assembly 18 shown in FIGS. 4 and 5, also specifically referred to as a double slot-die assembly 44 for purposes of this embodiment, defines a pair of linear film forming surfaces 20 (201, 202) arranged in converging relationship to each other, and in parallel relationship to the polymer cavity 12. The apparatus illustrated in FIGS. 4 and 5 also includes an upper die element 136, intermediate die element 132, and lower die element 124 including upper and lower polymer bars 125 and 126. The lower die element 124 of the die cartridge assembly 44 defines an elongated gas passage 46 extending parallel to a polymer cavity 48 for directing pressurized gas against molten polymer on both pair of linear film forming surfaces 201 and 202. Molten polymer is supplied to polymer cavity 48 from the extrusion body 10 via intermediate polymer cavity 12, passage 123, angled passages 127, and polymer passages 129 which feeds into polymer cavity 48. Pressurized gas is supplied from a pair of gas manifolds 16 to elongated gas passage 46 via intermediate passages 13, 131, 133 and 135. The gas supply passages 13, 131, 133 and 135 and polymer melt supply passages 12, 123, 127, 129, and 48 are physically separate from each other until they intersect at the film formation area 203. In this embodiment, and also the embodiment of FIGS. 1-2, the pressurized gas is generally conducted from radially outside supply source positions in the apparatus to a radially central discharge position at the film formation area 203, while the polymer melt is generally conducted in the opposite direction (i.e., radially inside-to-outside) from supply to discharge at the film formation area 203. Film fibrillation occurs once the path(s) of the film and gas intersect, which may begin to occur as the film descends against the film forming surfaces 201 and 202 and may continue to occur as the film is deposited into the gaseous stream. As shown in FIG. 5, element 137 is a bolt hole for mounting lower polymer bar 125 to upper polymer bar 126.

Figure 9:
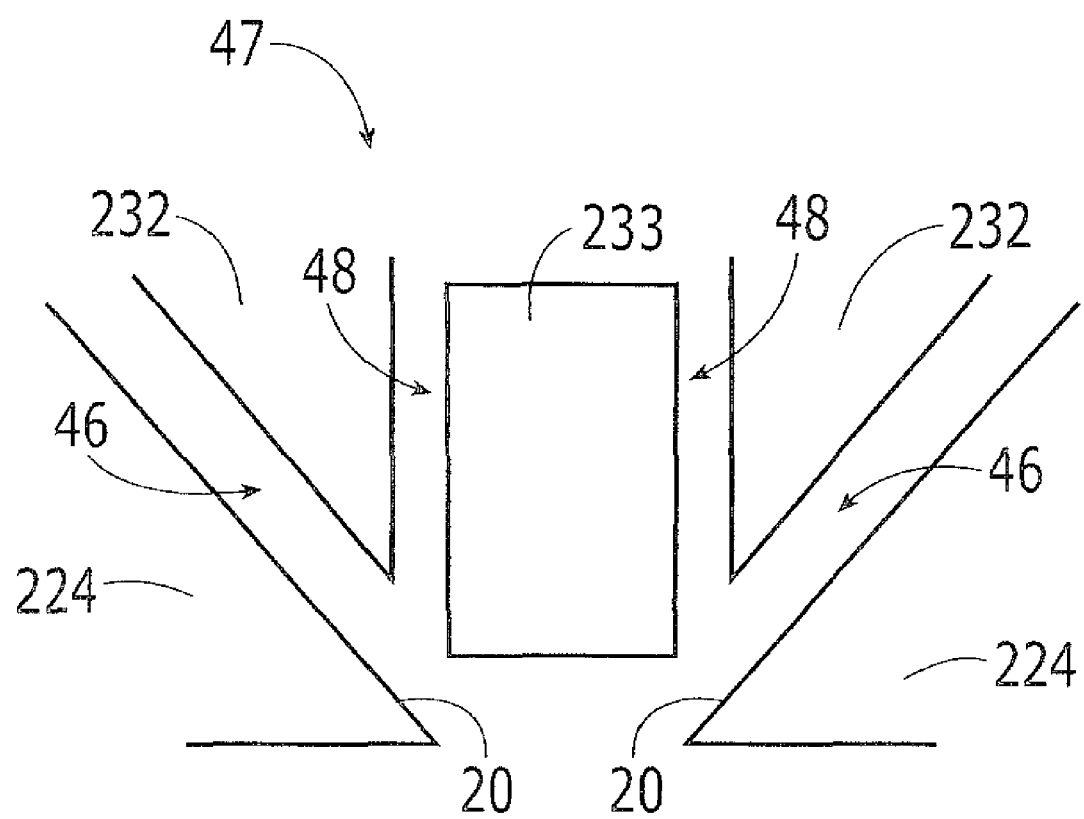
FIG. 9 is a sectional view of an illustrative alternative embodiment of the die cartridge assembly of the present invention.

In another illustrative embodiment, as shown in FIG. 9, the die cartridge assembly 47 includes die components 224, 232 and 233 in fixed relative position to each other, which define a pair of elongated polymer cavities 48 adapted to receive and feed molten polymer from an extrusion body (not shown but similar to that described above) to a pair of defined linear film forming surfaces 20 arranged in parallel relationship to each other, and a pair of gas passages 46 arranged in converging relationship for each directing pressurized gas for impingement against respective film forming surfaces 20. This die cartridge assembly 47 may include at least one adjustably positioned die elements that defines a pressurized gas passage or a polymer passage for adjusting the dimension of said film forming surface.

Figure 7:
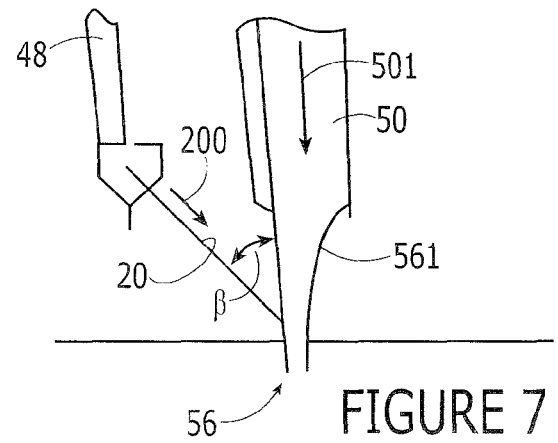
FIG. 7 is an enlarged isolated view of the film-forming area of the apparatus of FIG. 6.
Figure 8:
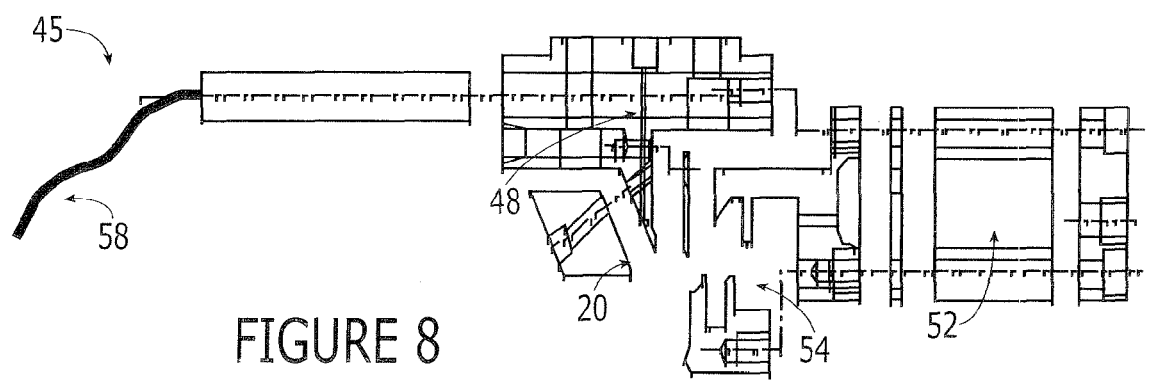
FIG. 8 is a sectional view an expanded view of the die cartridge assembly of FIG. 6.

In yet another illustrative embodiment, FIGS. 6, 7 and 8 show an apparatus 102 for producing fibrous material wherein the cartridge assembly is a single slot-die assembly 45, which defines at least one gas plenum chamber 50 communicating with at least one gas source 52, with pressurized gas being directed from a gas plenum chamber 50 against molten polymer on film forming surface 20. The gas plenum chamber 50 and film forming surface 20 extend along the length of the die cartridge assembly 45 in generally parallel relationship to the elongated polymer cavity 48. The pressurized gas is directed from gas source 52 through a tortuous gas passage 54 defined by the cartridge assembly 45 through which pressurized gas is directed from said gas plenum chamber 50 for impingement against said film forming surface 20 for enhancing velocity uniformity of the pressurized gas. Pressurized gas from the gas plenum chamber 50 is directed through a gas exit passage 56, which in this illustrated embodiment is disposed at an acute angle to the film forming surface 20, although not limited to this orientation. The gas exit passage 56 may be of various geometric formations, wherein a die element can be adjustably mounted to facilitate adjusting the geometry of the gas passage. In this regard, it should be noted that the configuration and/or surface finish of the gas passage, in this or other disclosed embodiments, can be selected to influence gas flow. In FIG. 7, gas flow 501 and the polymer flow 200 directions are generally indicated. Referring to FIG. 7, the film-forming surface 20 defined by the die cartridge assembly 45 may form an angle $\beta$ (beta) with the impinging gas flow direction 501 wherein the gas flow is channeled through lower end walls 561 of gas plenum chamber 50 that also define the gas exit passage 56 that feeds the pressurized gas into the film-forming area of the die cartridge assembly 45. The angle $\beta$ is not necessarily limited and an ideal value may vary depending on several factors, such as the intended product application, etc. For example, angle $\beta$ may vary from approximately 0 to approximately 180 degrees, i.e., the film-forming surface 20, and gas passage walls 561 may generally extend relative to each other at an acute, right, or obtuse angle.

Additionally, it is presently contemplated that portions of the present apparatus 102 through-out the polymer path, and in particular where formed fibers are separated from the apparatus, can be suitably treated, such as by the provision of specific surface treatment to the surfaces, to facilitate fiber formation. It is further contemplated that the distance from the gas exit passage 56 and film forming surface 20 may be adjusted to facilitate variations in the time allotted before the gas impinges upon the formed film.

Heat transferred to the cartridge assembly 45 from the extrusion body 10 under which the cartridge assembly 45 is positioned under may be utilized to heat the cartridge assembly of the present invention. However, the cartridge assembly 45 may also comprise a heating element 58 so as to heat the die cartridge assembly 45 independent from the extrusion body 10 (see FIG. 8). An independent heat source permits the cartridge assembly 45 and extrusion body 10 to operate at dissimilar temperatures. The die cartridge assembly 45 optionally may also include a gas plenum isolation element (not shown), which may include a thermal insulation element for thermally insulating the gas plenum from at least one polymer passage defined by the die cartridge assembly. It is believed that an insulating element positioned about the gas plenum permits the use of various gas temperatures without deleteriously affecting the polymer flow.

Cartridge assemblies 18, 44, 45, and 47, including the above-described modular components thereof, can be made of any suitably rigid material, which tolerate polymer melt and pressurized gas. In one non-limiting embodiment, the cartridge assembly is constructed of high-grade steel, such as stainless steel, which can be cast and machined into the desire configuration(s) such as described herein. It also may be formed of ceramic material, rigid high-temperature tolerant fiber-reinforced composite material, and so forth.

The use of air curtains may be incorporated into the aforementioned annular and non-annular cartridge assembly embodiments. Air curtains are believed to improve the uniformity of the fibrillated film and the resultant collected web.

The present invention further contemplates a process for producing fibrillated fibrous webs utilizing the disclosed cartridge assembly. The process for producing fibrillated fibrous webs includes the cartridge assembly of the present invention, which adapts to fit the lower extrusion body of standard meltspun equipment. As previously mentioned, the cartridge assembly accepts pressurized gas and molten polymer from the lower surface of the extrusion body, and in some instances, re-directs the pressurized gas and polymer to fibrillate film that subsequently forms a fibrous web. FIG. 3 is an illustrative embodiment of a cartridge assembly including annular nozzles and further shows the polymer and gas flow routes as the polymer and gas descend from the lower surface of the extrusion body (not shown) through the upper 36, intermediate 32, and lower die elements 24. The polymer flow route follows the segmented or dashed lines, while the gas flow route follows the solid lines.

Suitable polymeric materials for formation of the fibrous webs of the present invention are those polymers capable of being meltspun including, but are not limited to polyolefin, polyamide, polyester, poly(vinylchloride), polymethylmethacrylate (and other acrylic resins), polystyrene, polyurethane, and copolymers thereof (including ABA type block copolymers), polyvinylalcohol in various degrees of hydrolysis in crosslinked and non-crosslinked forms, as well as elastomeric polymers, plus the derivatives and mixtures thereof. Modacrylics, polyacrylonitriles, aramids, melamines, and other flame retardant polymers have been contemplated as well. The polymers may be further selected from homopolymers; copolymers, and conjugates and may include those polymers having incorporated melt additives or surface-active agents. The fibrous webs produced in accordance with the present invention may include fibers exhibiting one or more fiber diameters, wherein the fiber diameters can range from nanofiber diameters up to conventional meltblown or spunbond fiber diameters. Although not limited thereto, the fiber diameters may be, e.g., about 0.1 to about 1 micron, particularly about 0.3 to about 0.6 micron. Further, the nonwoven fabric of the present invention may exhibit basis weights ranging from very light to very heavy, wherein the range may include fabrics having a basis weight less than about 5 grams per square meter (gsm), to fabrics having a basis weight greater than about 200 gsm.

The nonwoven fabric produced in accordance with the invention may include one or more fibrous layers, as well as wovens, scrims, films, and combinations thereof, and may be utilized in the manufacture of numerous home cleaning, personal hygiene, medical, and other end use products where a nonwoven fabric can be employed. Disposable nonwoven undergarments and disposable absorbent hygiene articles, such as a sanitary napkins, incontinence pads, diapers, and the like, wherein the term "diaper" refers to an absorbent article generally worn by infants and incontinent persons that is worn about the lower torso of the wearer.

In addition, the fabric may be utilized as medical gauze, or similar absorbent surgical materials, for absorbing wound exudates and assisting in the removal of seepage from surgical sites. Other end uses include wet or dry hygienic, antimicrobial, or hard surface wipes for medical, industrial, automotive, home care, food service, and graphic arts markets, which can be readily hand-held for cleaning and the like.

The fabric of the present invention may be included in constructs suitable for medical and industrial protective apparel, such as gowns, drapes, shirts, bottom weights, lab coats, face masks, and the like, and protective covers, including covers for vehicles such as cars, trucks, boats, airplanes, motorcycles, bicycles, golf carts, as well as covers for equipment often left outdoors like grills, yard and garden equipment, such as mowers and roto-tillers, lawn furniture; floor coverings, table cloths, and picnic area covers.

The fabric may also be used in top of bed applications, including mattress protectors, comforters, quilts, duvet covers, and bedspreads. Additionally, acoustical applications, such as interior and exterior automotive components, carpet backing, insulative and sound dampening appliance and machinery wraps, and wall coverings. The fabric is further advantageous for various filtration applications, including bag house, plus pool and spa filters.

Depending on the desired end use application of the nonwoven fabric, specific additives may be included directly into the polymeric melt or applied after formation of the web. Suitable non-limiting examples of such additives include absorbency enhancing or deterring additives, UV stabilizers, fire retardants, dyes and pigments, fragrances, skin protectant, surfactants, aqueous or non-aqueous functional industrial solvents such as, plant oils, animal oils, terpenoids, silicon oils, mineral oils, white mineral oils, paraffinic solvents, polybutylenes, polyisobutylenes, polyalphaolefins, and mixtures thereof, toluenes, sequestering agents, corrosion inhibitors, abrasives, petroleum distillates, degreasers, and the combinations thereof. Additional additives include antimicrobial composition, including, but not limited to iodines, alcohols, such as such as ethanol or propanol, biocides, abrasives, metallic materials, such as metal oxide, metal salt, metal complex, metal alloy or mixtures thereof, bacteriostatic complexes, bactericidal complexes, and the combinations thereof.

From the foregoing, it will be observed that numerous modifications and variations can be affected without departing from the true spirit and scope of the novel concept of the present invention. It is to be understood that no limitation with respect to the specific embodiments illustrated herein is intended or should be inferred. The disclosure is intended to cover, by the appended claims, all such modifications as fall within the scope of the claims.

The invention claimed is:

1. A process for producing fibrous material comprising fibers, comprising steps of:
   providing an apparatus having a polymer extrusion body through which molten polymer is directed for delivery to an elongated polymer cavity at the lower portion of said extrusion body, and further comprising providing a die cartridge assembly positioned beneath said extrusion body and defining at least one film forming wall, said cartridge assembly defining at least one polymer passage for directing said molten polymer from said polymer cavity onto said at least one film forming wall, and further providing at least one gas passage operable to communicate with a gas source for directing pressurized gas from said gas source against said molten polymer in the form of a film for effecting formation of fibrous material comprising fibers;
   directing said molten polymer from said polymer cavity onto said at least one film forming wall; and supplying pressurized gas through said die cartridge assembly via said at least one gas passage against molten polymer on said at least one film forming wall in the form of a film for effecting formation of said fibrous material comprising fibers.

2. A process for producing fibrous material in accordance with claim 1, wherein:
said at least one film forming wall is annular, said pressurized gas being directed through said cartridge assembly centrally of said at least one annular film forming wall against said molten polymer.

3. A process for producing fibrous material in accordance with claim 2, wherein:
said cartridge assembly defines a plurality of annular film forming walls, and said cartridge assembly directs pressurized gas centrally of each of said annular film forming walls against molten polymer on each of said walls.

4. A process for producing fibrous material in accordance with claim 3, including:
arranging said plurality of annular film forming walls in a plurality of linear arrays, each of said linear arrays being positioned along a respective line at an acute angle to said polymer cavity.

5. A process for producing fibrous material in accordance with claim 1, wherein:
said at least one film forming wall is non-annular.

6. A process for producing fibrous material in accordance with claim 5, wherein:
said at least one film forming wall is linear.

7. A process for producing fibrous material in accordance with claim 6, including:
providing a pair of said linear film forming walls arranged in converging relationship to each other.

8. A process for producing fibrous material in accordance with claim 7, including:
supplying pressurized gas through an elongated gas passage defined by said cartridge assembly for direction against molten polymer in the form of a film for formation of fibrous material generally along a line that extends parallel to said polymer cavity.

9. A process for producing fibrous material in accordance with claim 7, including:
providing a pair of said linear film forming walls arranged in parallel relationship, and directing said pressurized gas against each of said film forming walls.

10. A process for producing fibrous material in accordance with claim 7, including:
providing a pair of film forming walls, and forming fibers on one of said walls that have an average fiber diameter that differs from an average fiber diameter of fibers formed on the other one of said walls.

11. A process for producing fibrous material in accordance with claim 1, including:
providing a gas plenum for supplying pressurized gas against said molten polymer, and enhancing the velocity uniformity of the pressurized gas as it is directed from said gas plenum against said molten polymer.

12. A process for producing fibrous material in accordance with claim 1, including:
heating said die cartridge assembly independently of said polymer extrusion body.

13. A process for producing fibrous material in accordance with claim 1, including:
insulating said pressurized gas.

14. An apparatus for producing fibrous material comprising fibers, comprising:
a polymer extrusion body through which molten polymer is directed for delivery to an elongated polymer cavity at a lower portion of said extrusion body,
at least one gas source for supplying pressurized gas generally beneath said extrusion body; and
a removable die cartridge assembly removably positioned beneath said extrusion body for effecting formation of said fibrous material by fibrillation of polymer films, and wherein said cartridge assembly defines:
a plurality of annular film forming walls, and
a plurality of polymer passages communicating with said polymer cavity for directing said polymer onto said plurality of annular film forming walls defined by said cartridge assembly, and
a plurality of gas passages communicating with said gas source arranged for directing pressurized gas from said gas source against molten polymer in the form of a film on said plurality of annular film forming walls for effecting formation of fibrous material comprising fibers from each of said film forming walls.

15. An apparatus for producing fibrous material in accordance with claim 14, wherein:
said cartridge assembly includes a lower die element which defines said plurality of film forming walls, and a respective plurality of nozzle inserts that fit generally within lower die element in respective operative association with said film forming walls,
each said nozzle insert defining with said lower die element an annular polymer passage through which molten polymer is directed to the respective film forming wall,
each said nozzle insert defining an inner gas passage for directing pressurized gas therethrough and against molten polymer in the form of a film.

16. An apparatus for producing fibrous material in accordance with claim 15, wherein:
each of said nozzle inserts includes at least one stand-off projection for engagement with said lower die element to enhance the uniformity of the thickness of polymer film directed from the respective annular passage onto the respective film forming wall.

17. An apparatus for producing fibrous material in accordance with claim 15, wherein:
said cartridge assembly further including an intermediate die element positioned adjacent to said lower die element, said plurality of nozzle inserts being positioned between said intermediate die element and said lower die element.

18. An apparatus for producing fibrous material in accordance with claim 17, including:
a deformable sealing element operatively positioned between each said nozzle insert and said intermediate die element to maintain a predetermined spacing between the nozzle insert and the lower die element.

19. An apparatus for producing fibrous material in accordance with claim 17, wherein:
said cartridge assembly further including an upper die element positioned above and adjacent to said intermediate die element, said upper die element and intermediate die element together defining at least one gas plenum chamber communicating with said at least one gas source, and further communicating with each said inner gas passage defined by each of said nozzle inserts.

20. An apparatus for producing fibrous material in accordance with claim 19, wherein:
said apparatus includes a pair of said gas manifolds positioned on respective opposite sides of said polymer extrusion body, said upper die element and said intermediate die element defining a pair of said gas plenum chambers respectively communicating with said pair of gas manifolds, said gas plenum chambers further communicating with each said inner gas passage defined by each of said nozzle inserts.

21. An apparatus for producing fibrous material in accordance with claim 20, wherein:
said nozzle inserts are arranged in a plurality of linear arrays in said die cartridge assembly, each of said linear arrays of nozzle inserts being positioned along a respective line at an acute angle with respect to said polymer cavity,
said upper die element and said intermediate die element defining a plurality of gas distribution passages each communicating with said at least one air plenum chamber, with each of said gas distribution passages arranged adjacent to said polymer cavity, and communicating with the inner gas passages of the insert nozzles of a respective one of said arrays of said insert nozzles.

22. An apparatus for producing fibrous material comprising fibers, comprising:
a polymer extrusion body through which molten polymer is directed for delivery to an elongated polymer cavity at a lower portion of said extrusion body,
at least one gas source for supplying pressurized gas generally beneath said extrusion body; and
a removable die cartridge assembly removably positioned beneath said extrusion body for effecting formation of said fibrous material by fibrillation of polymer films, and wherein said cartridge assembly defines:
at least one polymer passage communicating with said polymer cavity for directing said polymer onto at least one non-annular film forming wall defined by said cartridge assembly, and
at least one gas plenum chamber communicating with said gas source, with pressurized gas being directed from said gas plenum chamber against molten polymer in the form of a film on said at least one non-annular film forming wall for effecting formation of said fibrous material comprising fibers.

23. An apparatus for producing fibrous material in accordance with claim 22, wherein:
said gas plenum chamber and said film forming wall extend along the length of said die cartridge assembly in generally parallel relationship to said elongated polymer cavity.

24. An apparatus for producing fibrous material in accordance with claim 22, wherein:
said die cartridge assembly defines a tortuous gas passage through which pressurized gas is directed from said gas plenum chamber against said film forming wall for enhancing velocity uniformity of the pressurized gas.

25. An apparatus for producing fibrous material in accordance with claim 22, wherein:
pressurized gas from said gas plenum chamber is directed through a gas exit passage disposed at an acute angle to said film forming wall.

26. An apparatus for producing fibrous material in accordance with claim 22, wherein:
said die cartridge assembly includes a thermal insulation element for thermally insulating said gas plenum from said at least one polymer passage defined by said die cartridge assembly.

27. An apparatus for producing fibrous material comprising fibers, comprising:
a polymer extrusion body through which molten polymer is directed for delivery to an elongated polymer cavity at a lower portion of said extrusion body,
at least one gas source for supplying pressurized gas generally beneath said extrusion body; and
a removable die cartridge assembly removably positioned beneath said extrusion body for effecting formation of said fibrous material by fibrillation of polymer films, and wherein said cartridge assembly defines:
at least one polymer passage communicating with said polymer cavity for directing said polymer onto at least one linear film forming wall defined by said cartridge assembly, and
at least one gas passage communicating with said gas source arranged for directing pressurized gas from said gas source against molten polymer in the form of a film on said at least one linear film forming wall for effecting formation of said fibrous material comprising fibers, and
wherein said die cartridge assembly includes at least one heating element for heating said die cartridge assembly independently of said extrusion body.

28. An apparatus for producing fibrous material comprising fibers, comprising:
a polymer extrusion body through which molten polymer is directed for delivery to an elongated polymer cavity at a lower portion of said extrusion body,
at least one gas source for supplying pressurized gas generally beneath said extrusion body; and
a removable die cartridge assembly removably positioned beneath said extrusion body for effecting formation of said fibrous material by fibrillation of polymer films, and wherein said cartridge assembly defines:
a pair of linear film forming walls arranged in converging relationship to each other, and in parallel relationship to said polymer cavity,
at least one polymer passage communicating with said polymer cavity for directing said polymer onto said pair of linear film forming walls defined by said cartridge assembly, and
at least one gas passage communicating with said gas source arranged for directing pressurized gas from said gas source against molten polymer in the form of a film on said pair of linear film forming walls for effecting formation of said fibrous material comprising fibers.

29. An apparatus for producing fibrous material in accordance with claim 28, wherein:
said die cartridge assembly defines an elongated gas passage extending parallel to said polymer cavity for directing pressurized gas against molten polymer on both of said pair of linear film forming walls.

30. An apparatus for producing fibrous material comprising fibers, comprising:
a polymer extrusion body through which molten polymer is directed for delivery to an elongated polymer cavity at a lower portion of said extrusion body,
at least one gas source for supplying pressurized gas generally beneath said extrusion body; and
a removable die cartridge assembly removably positioned beneath said extrusion body for effecting formation of said fibrous material by fibrillation of polymer films, and wherein said cartridge assembly defines:
a pair of linear film forming walls arranged in parallel relationship to each other, at least one polymer passage communicating with said polymer cavity for directing said polymer onto said pair of linear film forming walls defined by said cartridge assembly, and a pair of gas passages communicating with said gas source and arranged in converging relationship for each directing pressurized gas from said gas source against molten polymer in the form of a film on a respective one of said film forming walls for effecting formation of said fibrous material comprising fibers.

* * * * *